Dec. 12, 1967     S. B. FIELD ETAL     3,357,391
PASSIVE STABILIZERS FOR TANKERS AND THE LIKE
Original Filed April 5, 1965     3 Sheets-Sheet 1
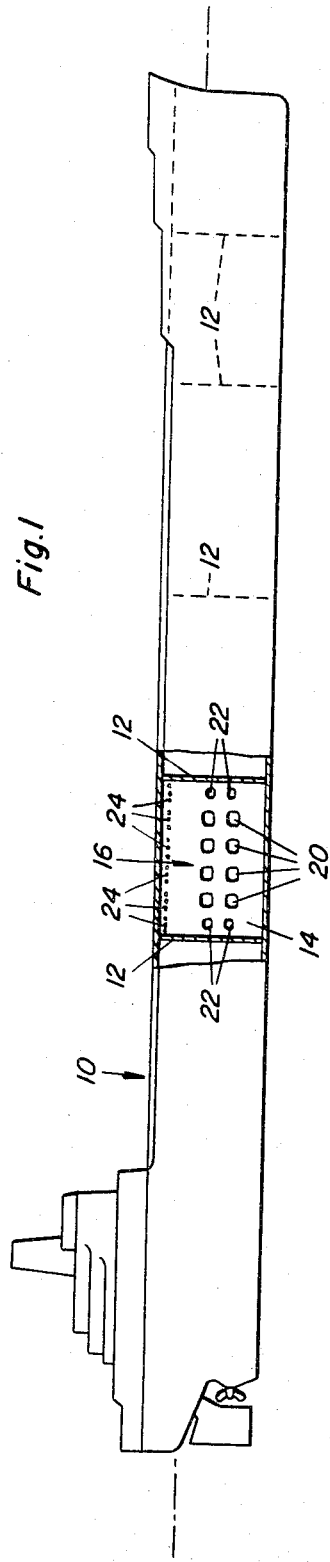
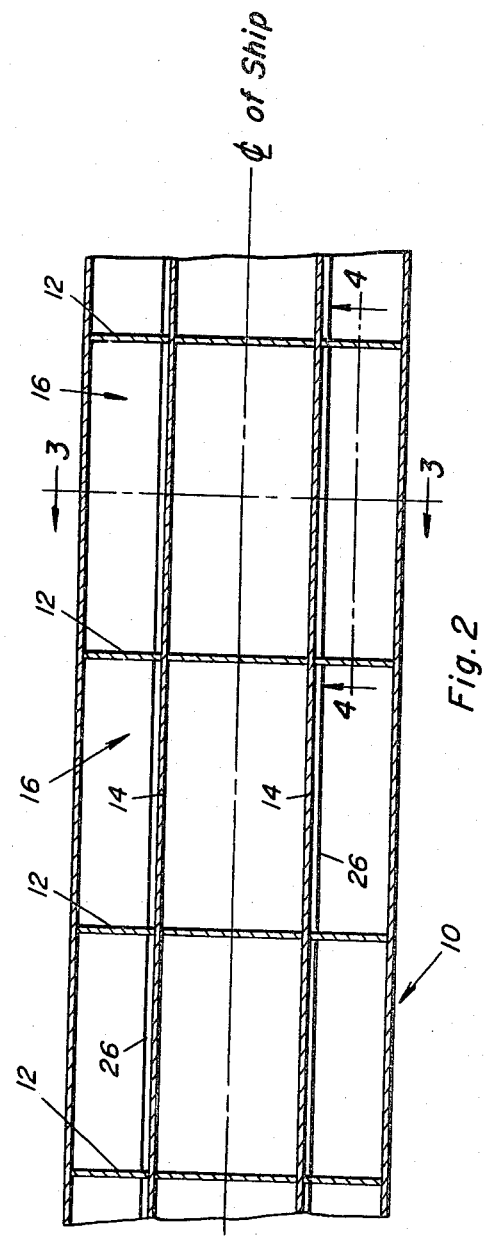
INVENTORS
*Sheldon B. Field*
*Thomas F. Bridges*
BY *Stevens, Davis, Miller, & Mosher*
ATTORNEYS

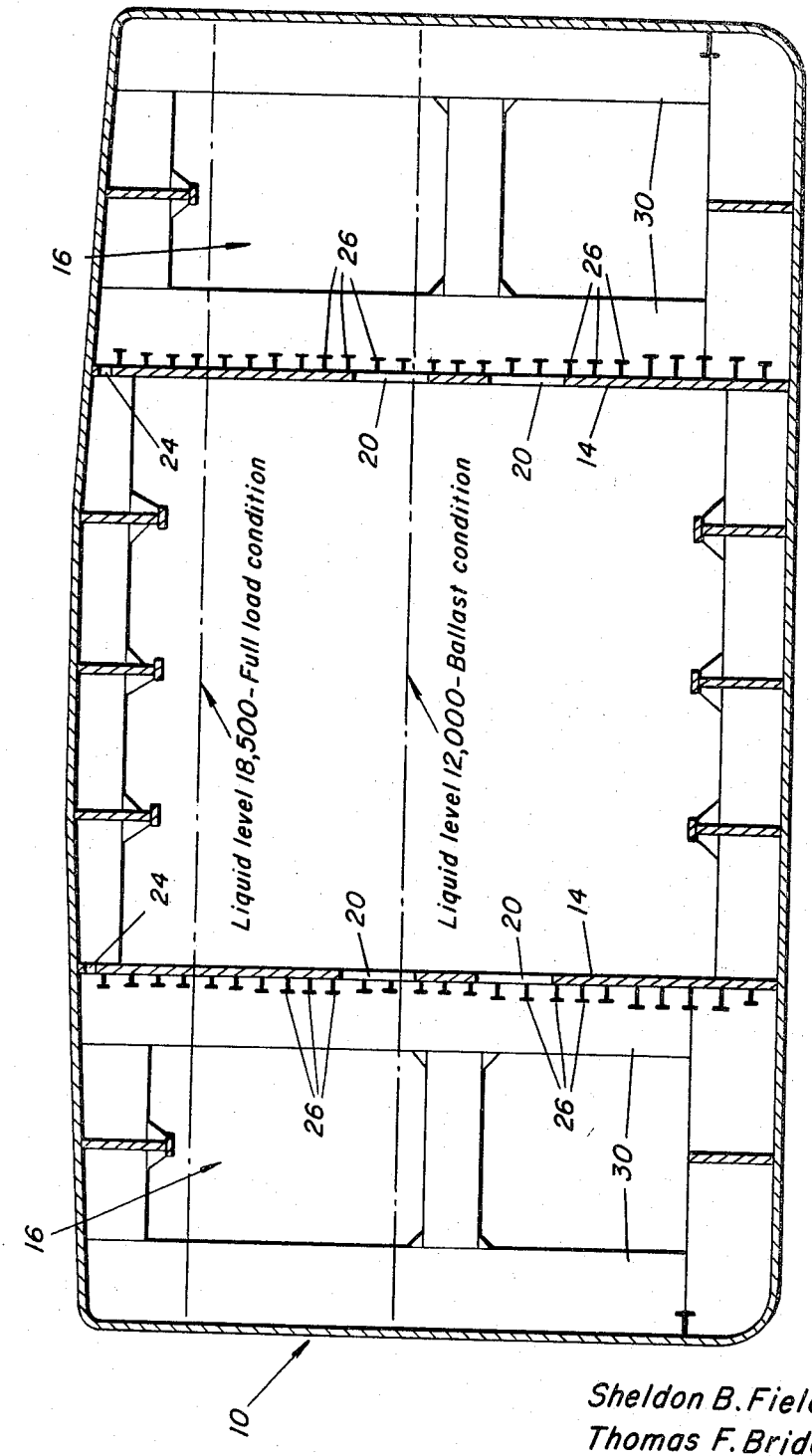

United States Patent Office 3,357,391
Patented Dec. 12, 1967

3,357,391
PASSIVE STABILIZERS FOR TANKERS
AND THE LIKE
Sheldon B. Field, Floral Park, and Thomas F. Bridges,
Port Washington, N.Y., assignors to John J. McMullen
Associates, Inc., New York, N.Y., a corporation of
New York
Continuation of application Ser. No. 445,514, Apr. 5, 1965.
This application May 12, 1967, Ser. No. 638,159
6 Claims. (Cl. 114—125)

ABSTRACT OF THE DISCLOSURE

A passive stabilization system for a tanker having a longitudinal structural bulkhead with horizontal stiffeners secured thereto and spaced at vertical intervals to insure the structural integrity of the bulkhead. Enlarged openings of generally square configuration with rounded corners are cut in the bulkhead in horizontally and vertically aligned zones and each large opening has a vertical dimension greater than the vertical spacing between the nearest horizontal stiffeners so that the total open area of the large openings in the bulkhead is less than if the openings were small cuts arranged only between the stiffeners for the case where the same amount of tank liquid passage damping is provided by the bulkhead.

---

This application is a continuation of application No. 445,514, filed Apr. 5, 1965, and now abandoned.

The present invention relates to improvements in passive stabilization systems for liquid cargo tankers and the like.

It is generally known that the sizes of newly designed liquid cargo tankers are now over 100,000 dead weight tons and due to this increased cargo carrying capability, the structural requirements for vessels of this type are becoming more exacting. Consequently, the present invention is drawn to improvements in the incorporation of passive stabilizers in vessels of this type.

It is a primary purpose of the present invention to provide a flume type passive stabilization system in cargo tankers, said system comprising the existing structural elements of the tanker; it is within the scope of this primary object to provide openings within the longitudinal bulkheads of the tanker, said openings being of such nature and design so as to detract as little as possible from the supporting function of the structural bulkhead involved and, at the same time, enable sufficient liquid transfer therethrough so that a suitable stabilizing moment is imparted to the vessel.

It is another object of the present invention to incorporate openings in the longitudinal bulkheads of a liquid cargo tanker to enable the same to function as a nozzle arrangement between the wing tanks and interconnecting compartment of a passive stabilization system, said openings being of such dimension that the openings are greater than the distance between the stiffeners mounted on said bulkhead.

It is another and further object of the present invention to provide air holes on the bulkheads with openings of the type described to enable an unimpeded passage of air between the respective compartments of the passive stabilization system.

Other and further objects of the present invention will become apparent with the following detailed description when taken in view of the appended drawings in which:

FIG. 1 illustrates a liquid cargo vessel having a portion of its hull shown in section;

FIG. 2 is a horizontal section taken along line 2—2 of FIG. 1;

FIG. 3 is a vertical section taken along line 3—3 of FIG. 2; and

Figure 4:
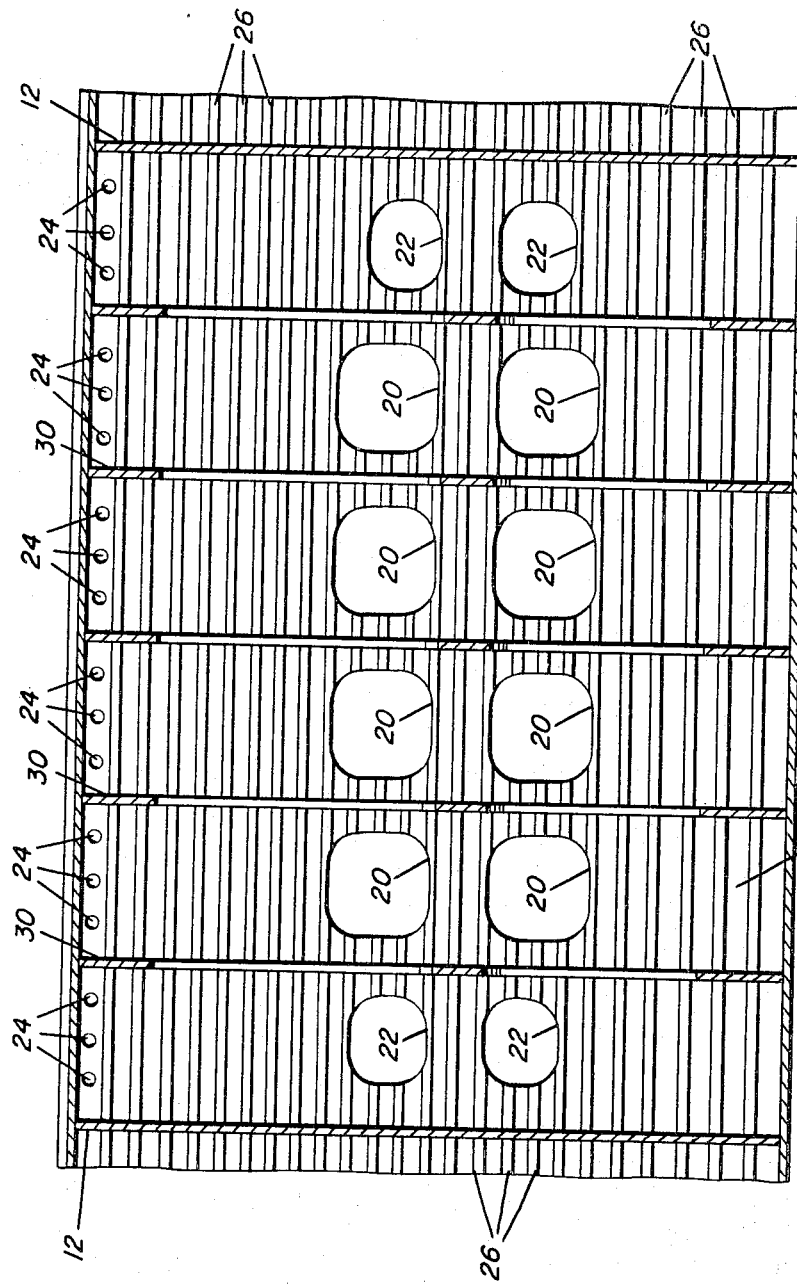
FIG. 4 is a vertical section taken along line 4—4 of FIG. 2.

Stated briefly, the present invention comprises an improvement over known passive stabilization systems for liquid cargo tankers and the like which have a plurality of openings in the longitudinal bulkheads thereof which are aligned and positioned between two transverse oil-tight bulkheads. The improvements according to the present invention are drawn to providing the longitudinal bulkheads with large openings of such shape and dimension as to extend more than the distance between two parallel stiffeners mounted on the respective bulkhead.

Referring to the figures in detail, there is shown a liquid cargo tanker generally indicated as 10 having a plurality of transverse oil-tight bulkheads 12 spaced along the longitudinal axis of the vessel. Extending substantially throughout the longitudinal dimension of the vessel is one or more longitudinal bulkheads 14 which is also oil-tight except as here described below. The vessel of the present example has two longitudinal bulkheads.

At least one of the compartments 16 functions as a passive stabilization system, and said compartment 16 is defined by the bottom and top of the hull together with the sides of the hull and transverse bulkheads 12. Bulkheads 14 divide compartment 16 into two outer wing tanks and a center connecting tank. The portions of the longitudinal bulkheads 14 within compartment 16 are provided with a plurality of large openings 20 and 22 located across the mid-section of said longitudinal bulkheads 14, to enable communication between each wing tank and the center tank. Smaller openings 24 are also provided along the top of the longitudinal bulkheads to enable unimpeded transfer of air therethrough in response to the movement of liquid through the larger openings 20 and 22.

A number of web plates 30 having large openings therein are spaced longitudinally of each other and are mounted transversely with respect to the vessel. These web plates 30 can be of any conventional type and their normal function is to provide additional transverse reinforcement to the vessel. As can readily be understood, these web plates also function to some extent as wash plates to prevent wild, uncontrolled movement of liquid within the compartments.

As better seen in FIGS. 3 and 4, a plurality of horizontally extending T stiffeners 26 are mounted on the longitudinal bulkheads to provide lateral support and stability to the bulkheads in anticipation of large lateral forces exerted by the liquid cargo within the tanks. The T stiffeners positioned closer to the bottom have an increasing lateral dimension due to the anticipated increased pressure exerted thereat by the liquid cargo. The stiffeners run throughout the length of the longitudinal bulkheads in the conventional manner.

Referring now to FIG. 4, it can be seen that openings 20 are of relatively large dimension and are preferably of square configuration but have rounded edges because of expected stress fields within the structural longitudinal bulkhead 14. Openings 20 are of such dimension so as to extend more than the distance between the horizontal stiffeners 26 mounted on bulkheads 14. It is preferable but not absolutely necessary that the stiffeners do not extend across the openings 20.

Outer openings 22 are also of large dimension but are somewhat smaller than openings 20 also because of the anticipated stress field within bulkheads 14. In this way, the large openings 20 and 22 enable sufficient liquid transfer therethrough in response to the roll of the vessel, but, at the same time, do not detract from the structural, supporting function of bulkhead 14. Moreover, with this arrangement of openings 20 and 22, fewer cuts need be made during manufacture or installation of the bulkheads than in the case of smaller openings.

It is preferred but not necessary that two or more opening 20 and 22 be vertically aligned and horizontally spaced with a set of openings being positioned between transverse web plates 30.

In operation, the tanker 10 and compartment 16 are filled to full load condition with the liquid cargo to be transported. Alternatively, the vessel and compartment 16 can be filled with ballast to approximately the level indicated in FIG. 3. In the event the vessel experiences forces from without tending to roll the same, the liquid cargo transfers through openings 20 and 22 in response to the roll and more liquid tends to accumulate at the lower side of the vessel than at the upper side of the vessel. With this greater accumulation of liquid at the lower side of the vessel, the next portion of the roll cycle of the vessel is impeded due to the stabilizing moment imparted to the ship. As the vessel continues to roll, the liquid within tank 16 transfers through the openings 20 and 22 to the opposite side of the vessel, where again a stabilizing moment is imparted to the vessel. The air within tank 16 transfers unimpeded through small openings 20 at the top of the longitudinal bulkheads in response to the liquid volume movement with the respective compartments of tank 16. The vessel is stabilized in this manner as long as the vessel continues to roll.

It should be understood that other and further modifications can be made to the disclosure without departing from the spirit and scope of the present invention.

What is claimed is:

1. In a tanker-like vessel, a stabilization system comprising first and second oil-tight transverse bulkheads extending across the hull of the vessel and extending vertically throughout the height of the hull, said transverse bulkheads defining with said vessel an elongated, enclosed container arranged across said vessel, at least one longitudinal bulkhead extending through said container and extending vertically throughout the height of the hull, a plurality of stiffening members secured along the longitudinal bulkhead within the container and arranged horizontally at vertically spaced positions so as to increase suitably the bending modulus of the bulkhead suitably to withstand predetermined loads, the portion of the bulkhead within the container defining large openings therein; and a body of liquid partially filling said container and having a liquid level above the lowest limit of said openings, whereby a portion of the liquid transfers through the openings in response to the roll of the vessel, said longitudinal bulkhead defining additional openings near the top thereof to enable an unimpeded passage of air therethrough, said large openings being generally square with rounded edges and being vertically and horizontally aligned in zones along the longitudinal bulkhead, the vertical dimension of each large opening being greater than the vertical spacing between said horizontal stiffening members at generally the same vertical location on said longitudinal bulkhead, and some of said stiffening members running along the solid parts of the bulkhead above, and below the vertically spaced large openings.

2. A stabilization system as set forth in claim 1 wherein a group of said large openings are of a first size and a group of said large openings are of a second smaller size, wherein the openings of said first size are vertically aligned in sets spaced longitudinally of each other and the openings of said smaller size are vertically aligned in sets near the outer longitudinal limits of the bulkhead within said elongated container.

3. A stabilization system as set forth in claim 1 wherein the stiffening members which are on the same vertical level as the openings have ends which terminate substantially at the periphery of said large openings so that the openings are generally unobstructed.

4. A stabilization system as set forth in claim 3 wherein said container further comprises web members mounted in said container and extending throughout the height of the hull, and wherein each web member is mounted transversely to the vessel between sets of vertically aligned openings in the longitudinal bulkheads.

5. A stabilization system as set forth in claim 1 wherein said large openings have an upper limit below the liquid level full liquid load condition of the container.

6. A stabilization as set forth in claim 3 wherein those stiffening members not on the same vertical level as an enlarged opening extend continuously along the solid parts of said longitudinal bulkhead within the container.

References Cited

UNITED STATES PATENTS

| 3,164,120 | 1/1965 | Field | 114—125 |
| 3,260,231 | 7/1966 | Hilliard | 114—125 |

MILTON BUCHLER, *Primary Examiner.*

T. M. BLIX, *Assistant Examiner.*